(No Model.)

F. RIBBEOK.
DRIP COFFEE POT.

No. 346,774. Patented Aug. 3, 1886.

WITNESSES
F. L. Ourand
Edward Stanton

Ferdinand Ribbeok
INVENTOR

By Louis Bagger & Co.
Attorneys

N. PETERS. Photo-Lithographer, Washington, D. C.

UNITED STATES PATENT OFFICE.

FERDINAND RIBBEOK, OF NEW IBERIA, LOUISIANA.

DRIP-COFFEE POT.

SPECIFICATION forming part of Letters Patent No. 346,774, dated August 3, 1886.

Application filed March 31, 1886. Serial No. 197,356. (No model.)

*To all whom it may concern:*

Be it known that I, FERDINAND RIBBEOK, a citizen of the United States, and a resident of New Iberia, in the parish of Iberia and State of Louisiana, have invented certain new and useful Improvements in Drip-Coffee Pots; and I do hereby declare that the following is a full, clear, and exact description of the invention, which will enable others skilled in the art to which it appertains to make and use the same, reference being had to the accompanying drawings, which form a part of this specification, and in which—

Figure 1:
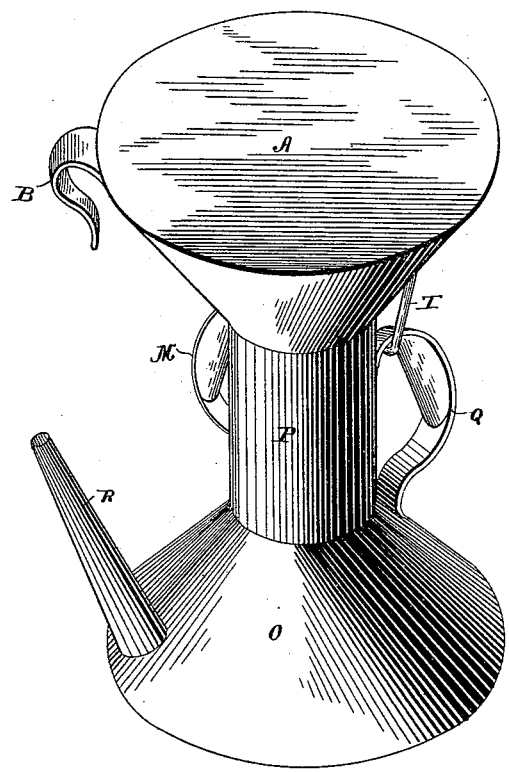
Figure 2:
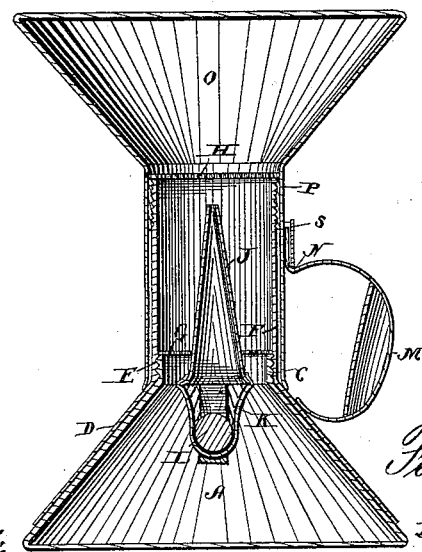

Figure 1 is a perspective view of my improved drip-coffee pot, and Fig. 2 is a vertical sectional view of the same.

Similar letters of reference indicate corresponding parts in both the figures.

My invention has relation to that class of coffee-pots in which the water is filtered through the coffee, causing all the strength of the coffee to be carried out of it by the water; and it consists in the improved construction and combination of parts of a pot in which a vessel for boiling the water has a perforated coffee-receptacle at its top, to the end of which receptacle a vessel for the reception of the ready coffee is attached, so that after boiling the water the apparatus is inverted, and the water will pass through the coffee into the receptacle for the made coffee-extract, as hereinafter more fully described and claimed.

In the accompanying drawings, the letter A indicates the boiling-vessel, which vessel is cone-shaped, and provided with a suitable handle, B, and with a screw-threaded neck, C. A correspondingly-shaped cap, D, fits around the sides of the boiling-vessel, and has an interior screw-thread, E, into which the screw-threaded neck of the boiling-vessel may fit, and the cap is provided at its apex with a neck, F, having a strainer, G, at the threaded portion, and a removable strainer-cap, H, at the other end, the said strainer-cap being secured upon said neck. A tapering tube, J, is secured at its wider end to the strainer G, and has a basket, K, formed over the wide aperture, which basket confines a ball, L, which fits upon the said wide end of the tube, closing the same when the pot is inverted to pass the water through the coffee, thus preventing any water passing from A to C through the steam-tube J. A curved handle, M, is secured at its upper end to the funnel-shaped portion of the cap, and has a projecting lip, N, at its other end. The pot O, for the reception of the made coffee-extract, is also funnel-shaped or conical, and is provided with a curved handle, Q, and with a spout, R, and a neck or tube, P, projects from the apex of the conical pot and fits around the tubular neck of the funnel-shaped cap. The side of the neck of the pot is provided with an ear, S, into which the lip of the handle upon the funnel-shaped cap may fit.

It will now be seen that the strainer-cap may be removed from the end of the neck of the funnel-shaped cap and the neck filled with ground coffee, whereupon the cap may be again secured upon the neck, and the funnel-shaped cap may be screwed over the screw-threaded neck of the boiler containing the water. The pot may be secured with its neck over the neck of the funnel-shaped cap, and the boiler may be placed over a fire. The ball will drop down from the wide aperture of the tapering tube, and as soon as the water in the boiler begins to boil the steam will pass up through the tapering tube and pass out through the spout of the pot. The entire apparatus may now be inverted, and the water will thus flow from the boiler through the strainer into the receptacle for the coffee, where it will draw out all the strength of the coffee and pass through the strainer-cap into the pot, from which it may be poured out for consumption.

The flaring part of the funnel-shaped cap provides for catching and returning to the neck of said cap any water which may escape through the point of union between the boiler and said neck when the pot is inverted. It also serves for a funnel when it is desired to remove the boiler and pour hot water from some other vessel through the ground coffee in the neck of said funnel-shaped cap. It will thus be seen that the coffee is not boiled from the ground coffee, and the entire apparatus will boil the water and make the coffee without any other attention being necessary than to watch when the water is boiling and to invert the apparatus, when the coffee will strain itself, and be ready for drinking as soon as passed through the neck holding the ground coffee.

For the purpose of holding the several parts of the apparatus together, the funnel-shaped cap is provided with a hook, T, which may engage the handle of the pot, keeping the portions of the entire apparatus together.

Having thus described my invention, I claim and desire to secure by Letters Patent of the United States—

1. The combination of a pot having a spout at one side and having a neck at its top, an ear secured to said neck, a coffee-receptacle having a strainer and a funnel-shaped flange at one end and a strainer-cap at the other, and a handle secured to said flange, and having a lip at its lower end to fit into said ear, substantially as and for the purpose set forth.

2. In a drip-coffee pot, the combination of a boiler having a neck at its top, and having a suitable handle, a coffee-receptacle fitting with one end removably upon the neck of the boiler, and having a tapering steam-escape tube passing through it, provided with a valve opening toward the boiler, and having strainers at the ends, and a pot having a spout, and having a neck at its top for the reception of one end of the coffee-receptacle, as and for the purpose shown and set forth.

3. In a drip-coffee pot, the combination of a conical boiler having a screw-threaded neck at its apex, and provided with a handle, a cylindrical coffee-receptacle having a strainer and a funnel-shaped flange at one end, and a strainer-cap screwed upon the other end, a pot having a spout, and provided with a cylindrical neck fitting over the coffee-receptacle, and formed with a handle, an ear at the side of the neck, a handle secured by one end to the flange of the coffee-receptacle, and having a lip formed at its other end, and a hook secured to said flange, as and for the purpose shown and set forth.

In testimony that I claim the foregoing as my own I have hereunto affixed my signature in presence of two witnesses.

FERDINAND RIBBEOK.

Witnesses:
EMILE RIBBECK,
JOSEPH A. REEANS.

Correction in Letters Patent No. 346,774.

Affidavit having been filed showing that the name of the patentee in Letters Patent No. 346,774, granted August 3, 1886, for an improvement in "Drip Coffee Pots," should have been written and printed *Ferdinand Ribbeck* instead of "Ferdinand Ribbeok," it is hereby certified that the proper correction has been made in the files and records of the case in the Patent Office, and should be read in the said Letters Patent that the same may conform thereto.

Signed, countersigned, and sealed this 7th day of September, A. D. 1886.

[SEAL.]

D. L. HAWKINS,
*Acting Secretary of the Interior.*

Countersigned:
    R. B. VANCE,
        *Acting Commissioner of Patents.*